(12) United States Patent
Duke et al.

(10) Patent No.: US 6,573,910 B1
(45) Date of Patent: Jun. 3, 2003

(54) INTERACTIVE DISTRIBUTED COMMUNICATION METHOD AND SYSTEM FOR BIDDING ON, SCHEDULING, ROUTING AND EXECUTING A DOCUMENT PROCESSING JOB

(75) Inventors: Charles B. Duke, Webster, NY (US); Warren B. Jackson, San Francisco, CA (US); Sudhendu Rai, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/447,822

(22) Filed: Nov. 23, 1999

(51) Int. Cl.[7] .......................... G06F 3/00; G06F 15/163; G06K 15/02
(52) U.S. Cl. ...................... 345/740; 345/736; 345/733; 345/771; 358/1.15; 358/1.14; 709/203
(58) Field of Search ................................. 345/740, 733, 345/765, 771, 965, 736, 738, 866; 709/201, 203, 202, 208, 321, 322; 358/1.15, 1.14, 1.13

(56) References Cited

U.S. PATENT DOCUMENTS

| | | | |
|---|---|---|---|
| 5,128,878 A | 7/1992 | Gore et al. ................. 345/502 |
| 5,488,458 A | 1/1996 | Benedict et al. ............... 399/15 |
| 5,509,108 A | 4/1996 | Yeh ............................. 358/1.15 |
| 5,580,177 A | * 12/1996 | Gase et al. ............ 358/1.15 X |
| 5,604,860 A | 2/1997 | Mclaughlin et al. ......... 345/866 |
| 5,655,081 A | * 8/1997 | Bonnell et al. ............. 709/202 |
| 5,725,211 A | 3/1998 | Blanchard et al. ..... 271/265.02 |
| 5,768,483 A | * 6/1998 | Maniwa et al. ............ 358/1.15 |
| 5,790,119 A | 8/1998 | Sklut et al. ............. 345/965 X |
| 5,815,764 A | 9/1998 | Tomory ......................... 399/1 |
| 5,920,405 A | 7/1999 | McIntyre et al. ............ 358/442 |
| 5,930,465 A | 7/1999 | Bellucco et al. ............ 358/1.15 |
| 6,115,132 A | * 9/2000 | Nakatsuma et al. ........ 358/1.14 |
| 6,271,927 B1 | * 8/2001 | Kohtani et al. ......... 358/1.13 X |
| 6,401,150 B1 | * 6/2002 | Reilly .................... 358/1.15 X |
| 6,498,656 B1 | * 12/2002 | Mastie et al. ............... 358/1.15 |
| 2002/0105671 A1 | * 8/2002 | Sugahara ................... 358/1.15 |

* cited by examiner

Primary Examiner—Raymond J. Bayerl
(74) Attorney, Agent, or Firm—Oliff & Berridge, PLC

(57) ABSTRACT

A method and system allows for interactive, distributed job processing, e.g., print job processing, using a network, e.g., the Internet, and self-aware, remote processing equipment. Self-awareness allows the equipment to provide information about its load and status to a system controller such as a system server, either directly or through location servers located near the remote processing equipment. The method and system provide the capability to perform scheduling, routing and bidding on execution of jobs as well as re-routing, re-scheduling, remote proofing and remote processing instruction modification.

29 Claims, 6 Drawing Sheets

INTERACTIVE DISTRIBUTED COMMUNICATION METHOD AND SYSTEM FOR BIDDING ON, SCHEDULING, ROUTING AND EXECUTING A DOCUMENT PROCESSING JOB

BACKGROUND OF THE INVENTION

1. Field of Invention

The present invention relates generally to a distributed job processing system and method with a plurality of remote job processing locations using information feedback over a network to improve job management. More specifically, the present invention uses feedback information pertaining to a customer, and network and remote job processing equipment to provide value-added capabilities both to an originator of the job, e.g., the customer, and to operators of the remote processing locations.

2. Description of Related Art

The proliferation of high-speed, high-bandwidth-communication over high performance networks has been one of the main factors that have influenced and will continue to influence the way customers and machines interact. For example, Internet users are utilizing that network to communicate and conduct business at rates and in ways not realized by any other communication media.

SUMMARY OF THE INVENTION

The present invention employs communications network capability to achieve various advantageous ends. In accordance with one aspect of the present invention, there is provided a document processing system including a server and a plurality of remote processing equipment locations coupled together over the Internet or some similar distributed communication system. A customer submits a document job to the server of the processing system through a customer interface for execution by job processing equipment at one of the remote processing equipment locations. The server includes a controller, a buffer and an input/output port coupled together via a bus.

The document job is characterized by a set of job attributes with each job attribute relating to a manner in which the document job is to be processed by the document processing system.

In accordance with a first exemplary embodiment, a customer submits a job to be processed by the document processing system. The system schedules and routes the job in accordance with the customer's requested processing attributes. Subsequently, the system polls remote processing equipment locations and provides information about the present state of the customer's job upon request of the customer and rescheduling and rerouting options that may improve delivery time, cost, etc. If the customer accepts any of the options, the system reschedules and/or reroutes the job based on the accepted options. The system repeatedly polls the remote processing equipment locations to gain information about the present state of the remote processing equipment locations until the job is completed. (It should be noted that the remote processing equipment locations could also broadcast their state information over a network in which case the system does not poll these locations but instead listens to broadcasted state information at specific time intervals. This approach applies to all places in the patent where polling is used as a means of obtaining information.)

In accordance with a second exemplary embodiment, a customer submits a job to be processed by the document processing system. The server of the system then polls the remote document processing equipment locations and receives state information about the capabilities and current status of the locations. The server then formulates a plurality of optional scheduling and routing schemes for the customer to review. The server then schedules and routes the job in accordance with the scheduling and routing scheme selected by the customer. Subsequently, the system polls the remote processing equipment locations, provides information about the present state of the customer's job upon request by the customer, and reschedules and/or reroutes the job as requested by the customer until the job is completed.

In accordance with a third exemplary embodiment, a customer submits a job to be processed by the document processing system. The server of the system then polls the remote document processing equipment locations and receives state information about the capabilities and current status of the locations. The server then formulates an optimized schedule and routing scheme based on the job attributes submitted by the customer, the state data received from the remote document processing equipment locations and, optionally, information previously stored in the system about preferences and characteristics of the customer. The server then outputs the optimized schedule and routing scheme for review, modification and confirmation by the customer, and schedules and routes the job in accordance with the optimized schedule and routing scheme. Subsequently, the system polls the remote processing equipment locations, provides information about the present state of the customer's job upon request by the customer, and reschedules and/or reroutes the job as requested by the customer until the job is completed.

Exemplary embodiments of the invention separately enable feedback of job data as it is processed from the remote processing equipment to the customer. The customer can use the data to satisfy himself whether the job has been processed according to his specifications. This allows the customer to provide appropriate feedback to the remote processing equipment based on that data, e.g., remote proofing or job validation.

Exemplary embodiments of the invention separately enable negotiation to obtain guaranteed performance and job delivery. Remote processing equipment location servers have complete real-time information about the loading and operational status of various equipment at the location, the state of media supplies at the location and jobs in queue at the location. The location server may use this information to provide real-time bids about job execution and delivery to customers. Customers can specify job requirements to various locations, obtain real-time bids and negotiate before submitting a job to a particular location for processing.

Exemplary embodiments of the invention separately enable remote customer review of completed jobs. The customer provides a complete description of the job that includes both processing and delivery. Some of the information the job may contain, e.g., addresses of recipients of the executed job, may reside in the remote processing equipment location database. The location validates the content of the job, feeds it back to the customer and obtains his approval or revision before dispatching the completed job to the recipients.

Exemplary embodiments of the invention separately enable real-time job tracking. The remote equipment location server has complete knowledge of the status of a job as it is processed. This information can be relayed to the customer also who can track his job as it progresses through processing and delivery.

Exemplary embodiments of the invention separately enable real-time rescheduling or rerouting of print jobs. Since the customer, a location operator or an expert system may each have complete knowledge of the real-time status of the jobs, each of these entities can replace/revise job processing data before the job is executed.

Exemplary embodiments of the invention separately enable the system to construct and maintain customized job templates. For example, a particular location can provide pre-specified job templates customized to one or more individual customers. These templates may be generated based on similar job submission in the past.

Exemplary embodiments of the invention also separately enable coordination of activity on a plurality of remote processing equipment at a particular location or locations. The availability of the state of all equipment at all locations and supplies in each of those locations allows the system to coordinate the activity of multiple equipment at a location, e.g., using the processing equipment server at that location, or multiple locations, e.g., using the system server.

Exemplary embodiments of the invention separately enable improved inventory control. The availability of an active information feedback control system that spans processing equipment, supplies, and operator and customer interfaces provide a location operator or server with a reliable estimate of inventory. This can greatly reduce costs related to maintaining inventory. The reduction in costs leads to higher profits for the location or system operator/owner and lower costs for the customer. Moreover, pricing of a customer job can be performed in real time based on the inventory of jobs, available equipment and/or supplies at that time.

DETAILED DESCRIPTION OF EXEMPLARY EMBODIMENTS

While the present invention will hereinafter be described in connection with an exemplary embodiment thereof, it will be understood that it is not intended to limit the invention to that embodiment. On the contrary, it is intended to cover all alternatives, modifications and equivalents as may be included within the spirit and scope of the invention as defined by the appended claims.

In accordance with one aspect of the present invention, there is provided a document processing system including a server and a plurality of remote processing equipment locations coupled together over the Internet or some similar distributed communication system. A customer submits a document job to the server of the processing system through a customer interface for execution by job processing equipment at one of the remote processing equipment locations. The server includes a controller, a buffer and an input/output port coupled together via a bus.

The document job is characterized by a set of job attributes with each job attribute relating to a manner in which the document job is to be processed by the document processing system. For example, when the system is directed to processing print jobs, these job attributes may include any or all of the following: job content, i.e., a description of information in the job, types of media on which to print the job, size of media on which to print the job, finishing options, type of machine on which to print the job; format in which the electronic document containing the job content is submitted(e.g., Postscript, PDF, etc.), payment information, job schedule modification; job interrupts, job inputs(e.g., where and when to obtain various special inputs), job outputs(e.g., how distribute or deliver the job), rescheduling, termination and job splitting information, and job constraints, (e.g., time, cost, resource).

Figure 1:
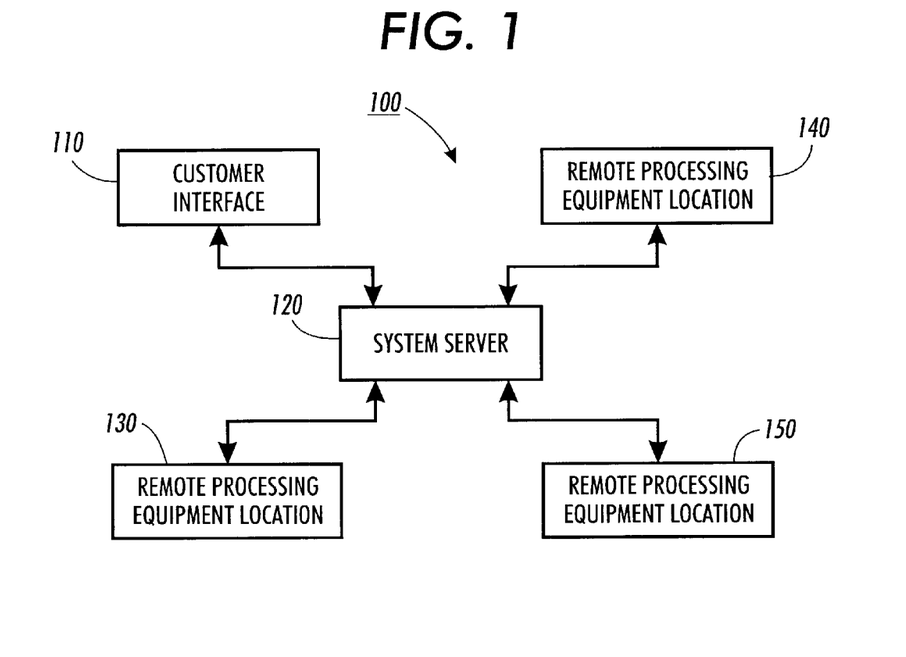
FIG. 1 is a schematic illustration of a distributed document processing system in accordance with the exemplary embodiments of the present invention.

FIG. 1 is a schematic illustration of a distributed document processing system in accordance with the exemplary embodiments of the present invention. As shown in FIG. 1, the system includes at least one customer interface 110, a system server 120, and a plurality of remote processing equipment locations 130–150, e.g., printshops. The customer interface 110 may be a computer, connected to the Internet using a generic web browser, specialized software for creating job specification data compatible with the system server, or any other effective communication device and system for submitting a job with job attributes.

Although FIG. 1 illustrates three remote processing equipment locations 130–150, the system may consist of any number of remote processing equipment locations, including the case that the system server and processing equipment co-reside at a given physical location. The system server 120 interacts with the customer interface 110 and each of the plurality of remote processing equipment locations 130–150 to process jobs requested by a customer(s) through the customer interface 110.

Figure 2:
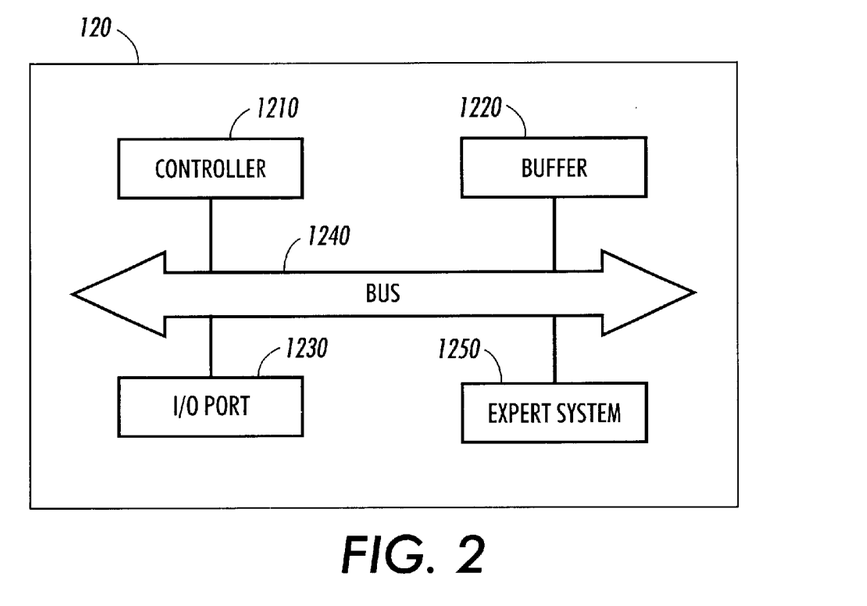
FIG. 2 is a schematic illustration of the distributed document processing system server of FIG. 1.

FIG. 2 is a schematic illustration of the distributed document processing system server 120 of FIG. 1. As shown in FIG. 2, the system server 120 includes a controller 1210, a buffer 1220, an input/output port 1230 and a bus 1240. The system server may also include an expert system 1250. The optional inclusion of the expert system is denoted by the dashed line coupling the bus 1240 to the expert system 1250. The controller 1210, buffer 1220, input/output port 1230 and expert system 1250 are coupled together via bus 1240. The controller 1210 controls the scheduling and routing of jobs to remote processing equipment locations.

The buffer 1220 provides memory for storing information used during scheduling and routing of jobs. Buffer 1220 also provides memory for storing the data about the jobs themselves following submission of the jobs via the customer interface 110. The buffer 1220 may be a single buffer or multiple buffers in different types of memory devices for storing different types of data, e.g., stable memory to store information such as routing addresses and scheduling routines of the remote processing equipment location as opposed to dynamic memory to store information such as job data that is dynamic requiring no long term storage. The input/output port 1230 provides a port for interaction between the server and the other elements of the system, e.g., the customer interface 110 and any or all of the remote processing equipment locations 130–150.

The expert system 1250 is an optional element of the system server 120 and is included for providing either a plurality of routing and scheduling schemes or an optimized routing and scheduling scheme to a customer in accordance with the second and third exemplary embodiments explained below in conjunction with FIGS. 6 and 7.

Figure 3:
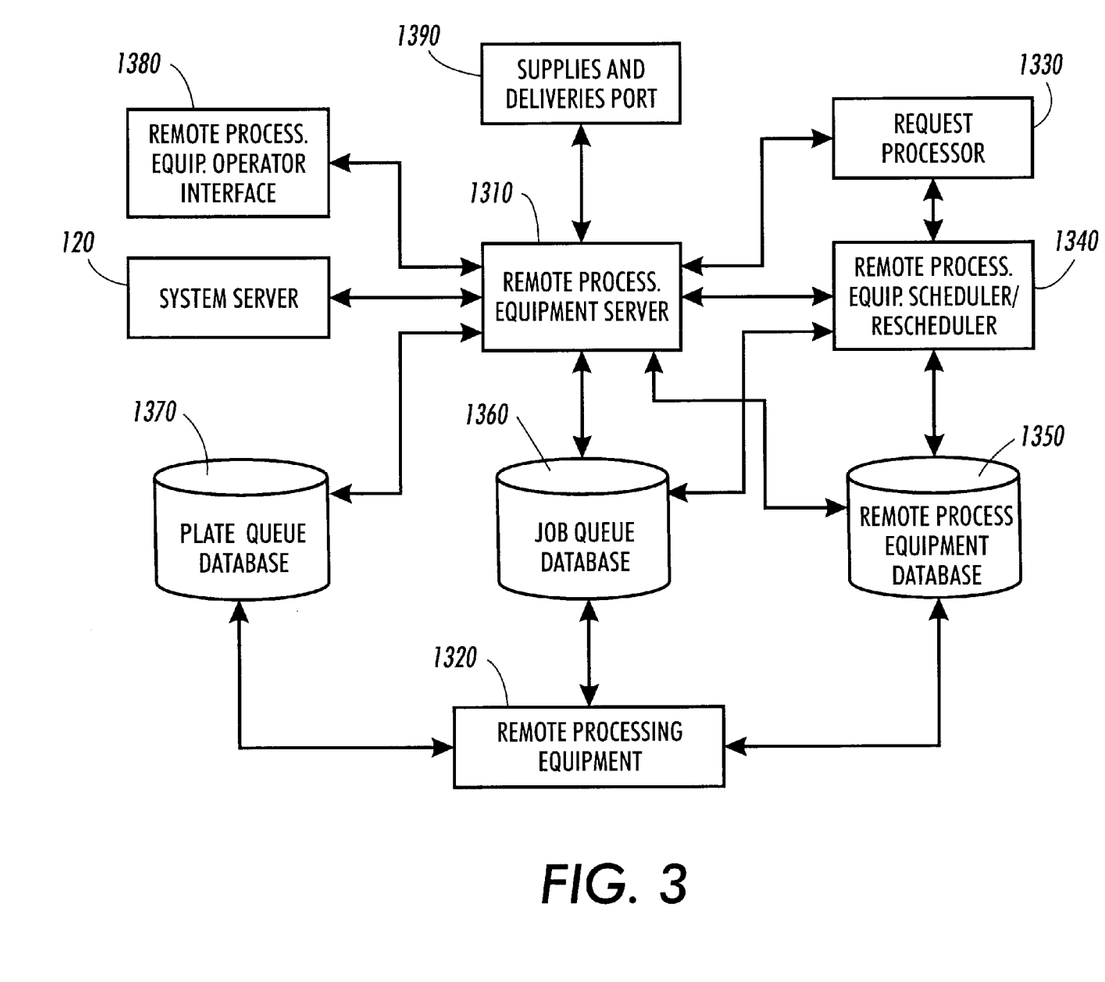
FIG. 3 is a schematic illustration of a remote document processing equipment location of FIG. 1.

FIG. 3 is a schematic illustration of an exemplary remote document processing equipment location 130 shown in conjunction with system server 120 of FIG. 1. Although FIG. 3 shows only location 130, the organization of the constituent parts of locations 140 and 150 are the same as that of location 130 although the detailed implementation may differ from one location to another. As shown in FIG. 3, the remote processing equipment location 130 includes a remote processing equipment server 1310, remote processing equipment 1320, a request processor 1330, a remote processing equipment scheduler/rescheduler 1340, a remote processing equipment database 1350, a job queue database 1360, a plate queue database 1370, a remote processing equipment operator interface 1380 and a supplies and deliveries port 1390. The system server 120 is coupled to the remote processing equipment server 1310 and receives jobs from the customer interface 110. The remote processing equipment server 1310 receives the jobs from the system server 120 and passes the job information to the request processor 1330. The remote processing equipment server 1310 may also send job rendering information used to create a job preview back to the system server 120 and back to the customer interface 110. The remote processing equipment server is also coupled to the remote processing equipment 1320, the request processor 1330, the remote processing equipment scheduler/rescheduler 1340, the remote processing equipment database 1350, the job queue database 1360, the plate queue database 1370, the remote processing equipment operator interface 1380 and the supplies and deliveries port 1390. The remote processing equipment server 1310 controls the operation of the devices 1330–1370.

The remote processing equipment 1320 may include any type of processing equipment that is used in connection with the services and products provided by the system 100, e.g., any suitable printer capable of producing prints on a print media such as paper from digital or video image signals and may, for example, comprise laser electrophotographic printers, ink jet printers, digitally driven lithographic presses, digital copiers, highlight or full process color printers, ionographic printers, laser disc writers, finishing equipment, binding machines, or combinations of the aforesaid devices, etc. The remote processing equipment 1320 operates in accordance with instructions provided using the remote processing equipment server 1310.

Each piece of equipment of the remote processing equipment 1320 includes a controller, not illustrated, that controls the processing of a job within that piece of equipment. For example, the controller for an in-line publishing station (e.g., a member of the DocuTech™ family) may accept a set of instructions describing the performance of a job, a collection of digital plates associated with the job, and instructions concerning the control of its associated finishers and feeders. Each piece of processing equipment 1320 has the capability to communicate throughput information, state information (e.g., if a job is sequential and requires equipment coordination), transformation information (e.g., indicating processes that must be performed prior to processing by another piece of equipment), and timing information. The equipment 1320 also provides information to database 1350 about dynamic and static equipment attributes, estimated future states, job attributes and states of supplies in the equipment.

The request processor 1330 operates in conjunction with the remote processing equipment server 1310 and the remote processing equipment scheduler/rescheduler 1340 to process job requests. The request processor 1330 is coupled to the remote processing equipment server 1310 and the remote processing equipment scheduler/rescheduler 1340. The server 1310 provides job descriptions to the request processor 1330, and changes in jobs already submitted. The request processor 1330 may provide information to the server 1310 including current states of jobs and actions taken on job change requests submitted by the customer.

The request processor 1330 also may provide information to the server 1310 about validation of jobs submitted, prompts for any errors or requests that cannot be fulfilled, alternative suggestions to the customer, for example, if the submitted job request cannot be fulfilled completely or can be fulfilled more quickly if changed slightly, and job cost computations. The request processor 1330 also provides information to the scheduler/rescheduler 1340 including the job description decomposed into sub-tasks, e.g., a job assembly tree, that the scheduler/rescheduler 1340 can use for scheduling on various pieces of the remote processing equipment 1320 as well as information about interrupts or requests for rescheduling of jobs provided by the customer through the customer interface 110. A job assembly tree is a formal description of a print job, e.g., using the print production format, abbreviated as PPF, developed by the International Cooperation for Integration of Prepress, Press and Postpress, abbreviated as CIP3, in which the complete job, e.g., a book, is specified in terms of an executable prescription for the generation of the union of its component parts, e.g., figures, text, pages, covers, binding and the like. The request processor 1330 also must be able to query the remote processing equipment database 1350 to create the job description.

The scheduler/rescheduler 1340 provides information to the request processor 1330 about action taken on job descriptions and schedules of jobs, e.g., associations of jobs to various pieces of remote processing equipment 1320, and an estimate of the timing of the use of this equipment. The remote processing equipment scheduler/rescheduler 1340 is also coupled to the remote processing equipment database 1350, which stores information necessary for the scheduling and rescheduling the operation of the remote processing equipment 1320.

The scheduler/rescheduler 1340 converts the executable description of the job, e.g., an assembly tree, into a device dependent set of instructions to the remote processing equipment, 1320, which it transmits to the job-queue database, 1360, either via the process equipment server, 1310, or directly, depending on the implementation. In cases of highly capable pieces of remote processing equipment 1320, e.g., members of the DocuTech™ family, some functions of the scheduler/rescheduler 1340 may be performed by the local controllers in the equipment itself.

The remote processing equipment database 1350 is also coupled to the remote processing equipment 1320 so that the database can store state information about the remote processing equipment 1320. This state information is used by the remote processing equipment scheduler/rescheduler 1340 to schedule jobs and by the request processor 1330 to process job requests. The remote processing equipment database 1350 is an information storage and retrieval unit. It is foreseeable that the database 1350 may reside either on the remote processing equipment server 1310 or on a separate server or servers. Regardless, the database 1350 provides information to the server 1310 and request processor 1330 in response to server 1310 queries about equipment 1320 attributes, states of jobs, states of supplies, personnel availability and the state of the location 130, e.g., current costs. The server 1310 also provides information to the database 1350 regarding availability of supplies and delivery schedules of processed jobs.

The remote processing equipment database 1350 stores various kinds of information about jobs, customers and remote processing equipment 1320 at the location 130. The database 1350 may provide information to the scheduler/rescheduler 1340 about both previous and current states of the remote processing equipment 1320, of supplies utilized by the equipment 1320, of the availability of personnel, and of all jobs accepted by the location 130.

The current state of the processing equipment consists of information such as powered up, initializing, ready, busy (with information on jobs in its queue), malfunctioning (with an error code), calibrating, powered down and the like.

The current state of supplies consists of information such as media and ink toner/developer materials on hand at the site, the cost of these media and materials, the media remaining in the paper trays (or rolls) of individual pieces of equipment, the remaining ink or developer in individual pieces of equipment, the number and type of customer replaceable units available on site, and the like.

The current state of personnel consists of information about the availability of trained operators for various pieces of equipment, their applicable usage rates for various scheduling of the jobs, and the like.

The current state of a job consists of information such as the decomposition of the job into subtasks, the assignment of subtasks to pieces of processing equipment, the fraction of each subtask that has been completed, the estimated completion time of each subtask, the resources, e.g., fonts, ink, and the like, needed to process the individual subtasks, customer related information about the job, e.g., billing, inquiry contact, special requests, and the like, due date and time for the job, and the like.

The scheduler/rescheduler 1340 may provide information to the database 1350 about current schedules of all unprocessed or partially processed jobs. The scheduler/rescheduler 1340 provides the modifications to jobs to the remote processing equipment 1320 through the remote processing equipment database 1350. In turn, the processing equipment 1320 provides information to the scheduler/rescheduler 1340 about the equipments' availability, current capabilities and current states of jobs being processed, e.g., normal, malfunctioning, etc.

The job queue database 1360 stores the job queue for the jobs to be processed. Each element of the queue consists of a description of the job structure suitable for execution by the controllers of the individual pieces of remote processing equipment 1320. This description contains pointers to digital plates that are stored in the plate queue database 1370 and an executable set of instructions to utilize these plates together with a set up of the remote processing equipment and supplies in the remote processing equipment location 130. The server 1310 provides information to the job queue database 1360 indicating the jobs submitted by customers and the schedules for those jobs for specific equipment 1320.

This information is typically obtained from the process-equipment scheduler 1340 in the form of device-specific instructions to the remote processing equipment, 1320, and provided to the job queue database 1360 in that form. The set of instructions contains the information necessary for the equipment 1320 to process individual components of a job, e.g., individual pages in a printing system, and to assemble these components into the complete job, e.g., a document or book.

The database 1360 provides the set of instructions to the equipment 1320 for job processing. The equipment 1320 provides information about the state of the execution of the set of instructions, e.g., consistency, processing status, error recovery and the like to the job queue database 1360. The job queue database 1360 provides information to the server 1310 about the state of the queue containing submitted jobs and validity checks on submitted jobs.

The plate queue database 1370 stores the queue of digital image plates associated with the jobs accepted by the remote processing equipment location 130 for production. The equipment 1320 communicates with the plate queue database 1370 to request digital plates and provide validation of plates, e.g., if plates are corrupted, out of range of the equipment 1320, etc. The plate queue database 1370 provides information to the server 1310 about validity checks on the submitted plates, e.g., if plates are corrupted, out of the range of the equipment 1320, etc. The plate queue database 1370 also provide information to the server 1310 about the state of the processing of plates within individual pieces of equipment 1320.

The remote processing equipment operator interface 1380 provides an interface for an operator that may be a human, a robot or a computer program that interfaces with the remote processing equipment location server 1310 to coordinate the activities at the location 130. Such an operator may provide interfaces with a customer in addition to those provided by the remote processing equipment server 1310 and make decisions about scheduling, job acceptance etc. The operator may also provide updates about available supplies to the location 130, updates about job status, and implement scheduling that accomplishes a single job on multiple pieces of equipment 1320 at the location 130. The operator may also answer customer queries through the network 100, e.g., future availability of new features at the remote processing equipment location 130. The server 1310 also provides information to the operator through interface 1380 about customer requests and queries and information in the database 1350 including the states of jobs, states of equipment 1320 and states of supplies within the equipment 1320.

The supplies and deliveries port 1390 serves to provide a port for supplies, such as media supplies, and deliveries, such as deliveries of completed jobs. The port 1390 provides information to the server 1310 about the state of job deliveries submitted to the port, delivery schedules, supplies order schedules and state of supplies at the location 130. The port 1390 generates an inventory of media supplies and handles ordering of supplies for the location 130 as well as the delivery of finished jobs to customers through various providers, e.g., USPS, UPS, Federal Express, etc. The server 1310 provides information to the supplies and deliveries port 1390 about job supply and delivery options, e.g., in a printshop environment, ink and paper (input) options, job availability and delivery times, and delivery options.

The distributed communications system 100 illustrated in FIG. 1 may be realized on a network that may be any means of communicating information electronically. Therefore, the system 100 may be realized using the Internet, telephone, LAN, WAN, ISDN, ATM or any other similar communication structure. One or more pieces of equipment may be linked to this system via the intervention of a human operator.

The system 100 provides the opportunity to perform real-time monitoring of job processing. This allows customers, e.g., through the customer interface 110, remote processing equipment operators, e.g., through the remote processing equipment operator interface 1380, and/or expert systems, e.g., expert system 1250, to monitor the remote processing equipment at location 130, 1320, and its states, to preview the likely job appearance and to obtain information about the status of a particular processing job and/or piece of remote processing equipment 1320.

With this real-time monitoring capability, customers, the remote processing equipment operators or an expert system can make informed decisions relating to rescheduling or rerouting a particular job when the present routing or scheduling scheme for the job will somehow be deficient, e.g., the customer would like the job completed by tomorrow but the present scheduling and routing scheme will result in the job completed next week. Moreover, the customer can preview the likely job appearance upon completion due to the current capabilities of the remote processing equipment 130–150. For example, certain kinds of machines, inks, or print media may be present at a particular site, that would produce a differing job appearance compared with another site. The customer can proactively alter the job resulting in acceptable job completion. Improved resource utilization, reduced costs, and faster completion times can result from the preview capability.

Additionally, the real-time monitoring capability allows the remote processing equipment 1320 to communicate with the customer, remote processing equipment operators or expert systems in order to indicate the present status of supplies and deliveries at the location 130. For example, if an inventory control module of the remote processing equipment server 1310, communicates that a particular remote processing equipment location 130, e.g., a printshop, is running low on a particular type of paper, the customer, remote processing equipment operator or expert system can schedule and route, or reschedule and reroute, based on that information. Similarly, the inventory control module can provide information about toner, ink, shipping boxes and any other type of supplies received through the supplies and deliveries port 1390 and necessary for processing jobs.

Further, the remote processing equipment in location 130 can provide real-time, dynamic information about the location. For example, assume a customer in Indianapolis submits a job for processing in Chicago. If the job is scheduled and routed to be processed in Chicago and a blizzard hits Chicago, the remote processing equipment location 130 may not be able to process the job. Therefore, the remote processing equipment server 1310 at the location can communicate with the customer through the customer interface 110 or the expert system 1250 to reschedule and reroute the job to Dallas for processing. Following completion, the job could be shipped to the customer in Indianapolis overnight.

Moreover, the remote processing equipment location 130 can provide real-time, dynamic state information about its present load to the system server 120 to provide the capability of offering reduced processing prices for processing at less-loaded locations. For instance, a customer in Indianapolis may initially request scheduling and routing of a job to a remote processing equipment location in Indianapolis. Using information about the load of the remote processing equipment location 130 provided by the remote processing equipment server 1310 in Indianapolis and servers of other remote processing equipment locations 140 and 150 throughout a geographic area, the system server 120 is able to formulate a schedule of prices that may vary depending on location based on the present and anticipated, future job loads of the various locations.

For example, a job price may be $49.85 for job completion and delivery to the customer facility if the job is processed at the Indianapolis remote processing equipment location. Alternatively, the job price will be $37.95 if the job is processed at a remote processing equipment location in Marion, Ind. The price reduction between the Indianapolis and Marion locations may stem from the decreased job load presently experienced at the Marion location. Alternatively, the price difference may be based on price of labor, maintenance cost of facilities at remote locations or any other operation cost that varies based on location or may dynamically change.

Figure 4:
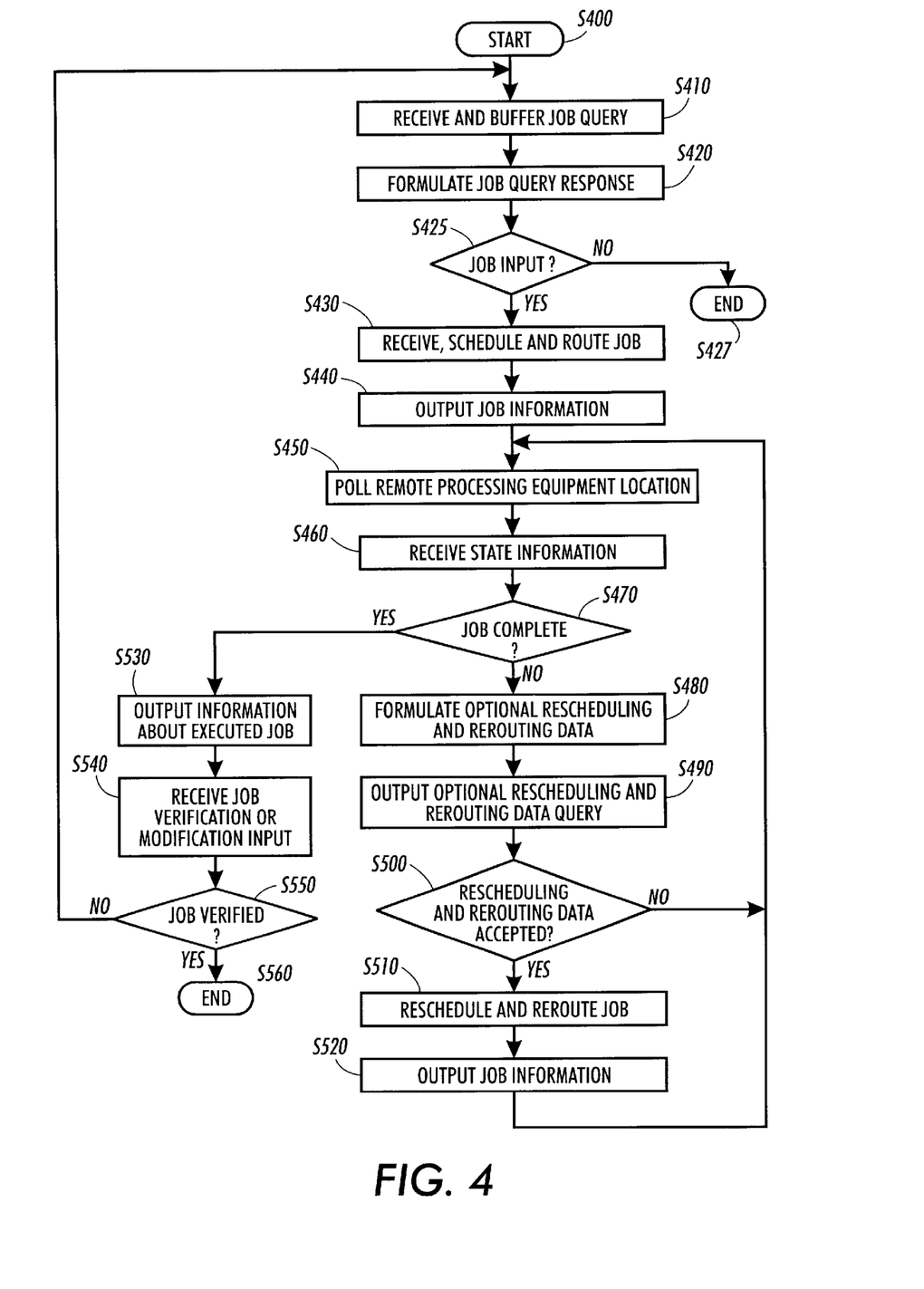
FIG. 4 illustrates a method for bidding on, scheduling, routing and executing a print job.

FIG. 4 illustrates a method for bidding on, scheduling, routing and executing a print job. In accordance with the exemplary embodiment, a customer initiates a job by submitting queries about the job, including job attributes, to the document processing system. In step S400, the method begins and control proceeds to step S410. In step S410, the system receives and buffers a job query, and control proceeds to step S420. The job query includes, for example, job attributes or, when appropriate (as in the third exemplary embodiment described in connection with FIG. 7), optimization criteria. A job query may request a determination of whether a given job, described by submitted job attributes, may be performed in accordance with the job attributes. Job attributes may include time constraints, purchase constraints, cost constraints, format constraints, delivery constraints, etc. In step S420, the system analyzes the job query and formulates a response. Then control proceeds to step S425. In step S425, it is determined whether the customer is satisfied with the response to the query and, as a result, has submitted a job for processing. If a job has been submitted, control proceeds to step S430, in which the system receives, schedules and routes the customer's job based on the job attributes, and control proceeds to step S440. Otherwise, control proceeds to step S427, in which the process ends. If control proceeds to step S427, it should be noted that the customer may submit another job query, which would reiterate steps S400 through S420, or discontinue job query negotiation. In step S440, confirmation information is provided to the customer about the job schedule, e.g., delivery time, path, etc., and cost, and control proceeds to step S450.

In step S450, the remote document processing equipment locations are polled to determine the current state of the remote document processing equipment, the equipment location and the customer's job, e.g., including remote processing equipment availability, where in a queue the job is located, how much of the job has been accomplished, etc. As noted earlier, the term "poll" is used as a generic designation for the acquisition of state information by e.g., the systems server, 120, and need not imply that the server literally polls the remote location.

Control then proceeds to step S460. In step S460, a central location of the system receives the state information provided in step S450. Control then proceeds to step S470 in which it is determined whether processing of the customer's job is completed. If the job has been completed, control proceeds to step S530 information is made available about the completed job. If the job has not been completed, control proceeds to step S480 in which optional rescheduling and rerouting data is formulated and control proceeds to step S490.

In step S490, the optional rescheduling and rerouting data is output to the customer for review and consideration, and control proceeds to step S500. Step S490 may provide rescheduling, termination and job splitting costs, and schedules for review and acceptance by the customer. In this way, the customer is then provided the opportunity to make informed routing and scheduling decisions. It is foreseeable, that audio communication with the customer is possible to indicate job status and rescheduling and rerouting options. Also, visual job completion information may be available to the customer through the system (e.g., using a Java script showing a job's current and anticipated progress through various steps of the work flow).

In step S500, it is determined whether any options for rescheduling and rerouting the job have been approved by the customer. If so, control proceeds to step S510 in which the job is rescheduled and/or rerouted in accordance with the approved options. Control then proceeds to step S520, in which confirmation information is provided to the customer about the job schedule, e.g., delivery time, path, etc., and cost, and control proceeds to step S450 for repeated polling of equipment. If in step S500, no rescheduling and rerouting data is accepted, control also returns to step S450.

This process continues until the processing of the job is completed, as indicated in step S470. As explained above, when processing of the job is complete, control proceeds to step S530. In step S530, the method outputs information to the customer about the completed job, e.g., for remote proofing, confirmation of processing and delivery instructions, etc. Because of the real-time, dynamic information and management, the method can provide information that aids the customer in job verification, proofing and simulation. Moreover, the method may be able to provide visual images of the job, e.g., in the context of printing jobs, for the customer to review. Such information may include, e.g., a camera view of the job product as well as information regarding delivery of the job. Control then proceeds to step S540, in which job verification or modification information is received. Such information may include identifications of errors in the job. Control then continues to step S550. In step S550, a determination is made whether the job has been verified. If the job has been verified, all remaining tasks for delivery of the job are performed as indicated by the information provided in step S530. Control then proceeds to step S560, in which the method ends. Alternatively, if the job has not been verified and the job has been modified, control returns to step S410 in which the job is reprocessed.

Figure 5:
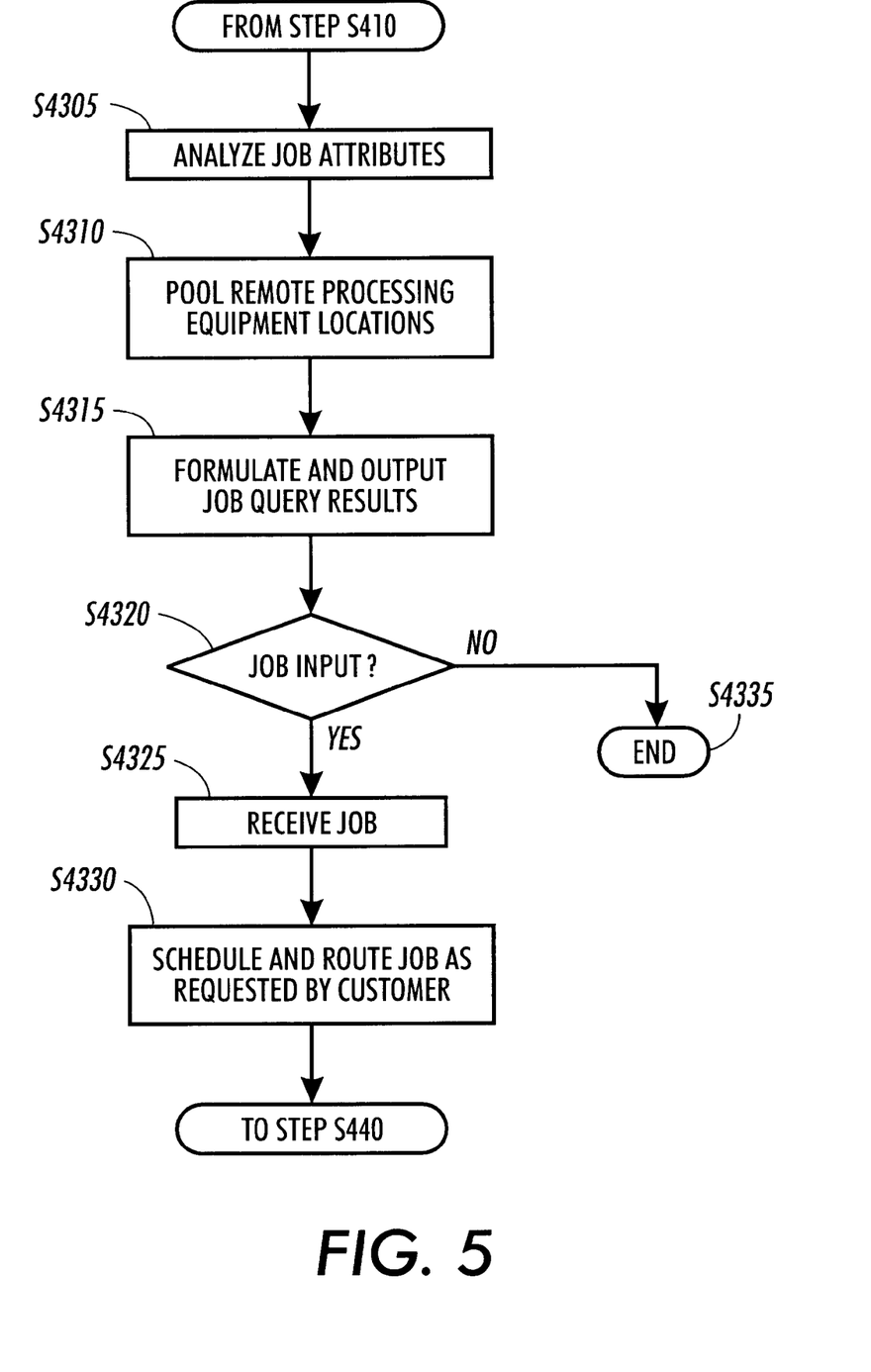
FIG. 5 illustrates method steps in accordance with a first exemplary embodiment for bidding on, scheduling and routing a print job.

FIG. 5 illustrates method steps performed in connection with the method illustrated in FIG. 4 in accordance with a first exemplary embodiment for bidding on, scheduling and routing a print job. FIG. 5 illustrates the method steps S420 to S430 in more detail. Specifically, in a first exemplary embodiment, formulating the job query response in step S420 and receiving, scheduling and routing the job in step S430 of FIG. 4 begins in step S4305, in which job attributes are analyzed. These job attributes may be information provided as part of the job query received in step S410, information stored in a database of customer specific information, etc. Control then proceeds to step S4310 in which the remote processing equipment locations are polled and provide information about the present state of the remote document processing equipment, the equipment location, etc. Control then proceeds to step S4315.

In step S4315, job query results are formulated and output to the customer for review. Such query results may include, for example, a delivery date or time, processing path, cost, etc. for the customer's review. This information is provided to the customer so that he may make an informed decision prior to submitting the job to be processed. Control proceeds to step S4320, in which it is determined whether the customer has submitted the job for processing. If the job has not been submitted, control proceeds to step S4335, in which the method ends.

If the job has been submitted control proceeds to step S4325. In step S4325, the job is received and control proceeds to step S4330. In step S4330, the job is scheduled and routed as indicated in the job query results outputted in step S4315. Because the job query results are formulated based on the job attributes received as part of the job query or in some other customer specific manner, the job is scheduled and routed based on the attributes provided by the customer. Therefore, if the customer wants the job to be routed to a location in Chicago, Ill., the job is routed and scheduled accordingly.

Control then proceeds to step S440 as shown in FIG. 4. Subsequently, the remote processing equipment locations are polled and provide information about the present state of the customer's job upon request by the customer, and reschedules and/or reroutes the job as requested by the customer until the job is completed as indicated by the method steps illustrated in FIG. 4.

Figure 6:
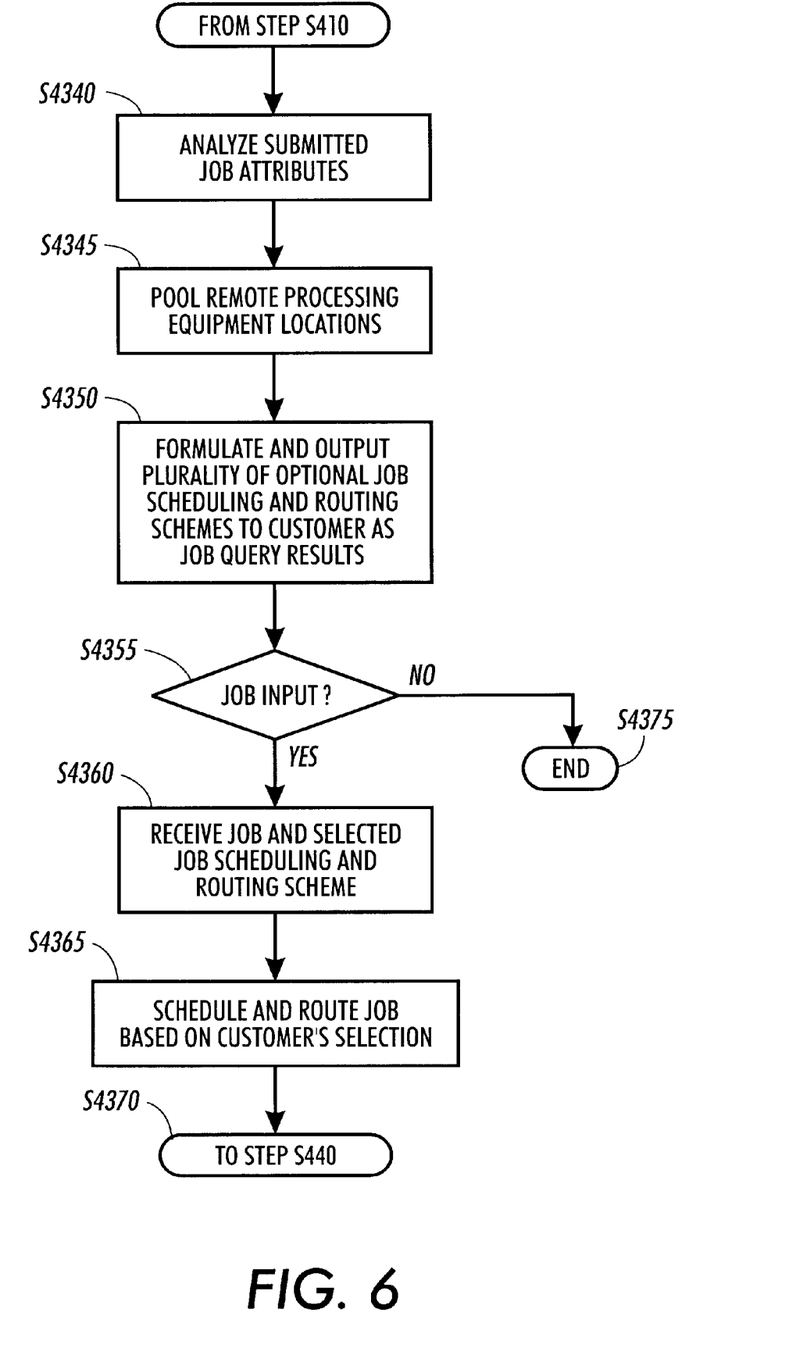
FIG. 6 illustrates method steps in accordance with a second exemplary embodiment for bidding on, scheduling and routing a print job.

FIG. 6 illustrates method steps performed in connection with the method illustrated in FIG. 4 in accordance with a second exemplary embodiment for bidding on, scheduling and routing a print job. FIG. 6 also illustrates the method steps S420 to S430 in more detail. Specifically, in a second exemplary embodiment, formulating the job query response in step S420 and receiving, scheduling and routing the job in step S430 of FIG. 4 begins in step S4340, in which job attributes are analyzed.

These job attributes may be information provided as part of the job query received in step S410, information stored in a database of customer specific information, etc. Control then proceeds to step S4345 in which the remote processing equipment locations are polled and provide information about the present state of the remote document processing equipment, the equipment location, etc. Control then proceeds to step S4350.

In step S4350, job query results are formulated and output to the customer for review. In step S4350, a plurality of optional job scheduling and routing schemes are formulated and outputted to the customer. Control then proceeds to step S4355 in which it is determined whether the customer has submitted the job for processing. If the job has not been submitted, control proceeds to step S4375, in which the method ends.

If the job has been submitted control proceeds to step S4360. In step S4360, the job and the scheduling and routing scheme selected by the customer is received and control proceeds to step S4365. In step 4365, the job is scheduled and routed based on the customer's selection. Control then proceeds to step S440 as shown in FIG. 4. Subsequently, the system polls the remote processing equipment locations, provides information about the present state of the customer's job upon request by the customer, and reschedules and/or reroutes the job as requested by the customer until the job is completed as indicated by the method steps illustrated in FIG. 4.

Figure 7:
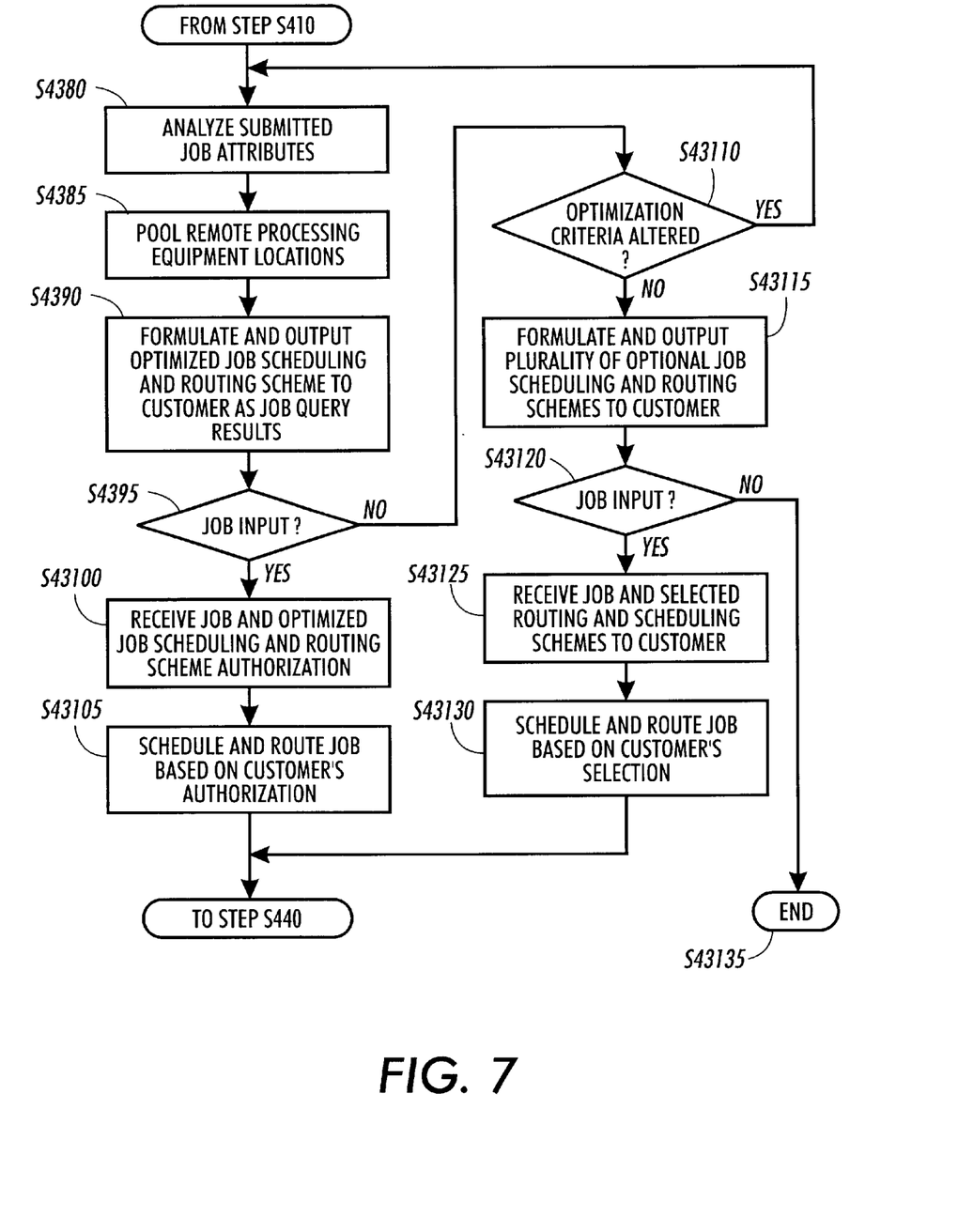
FIG. 7 illustrates method steps in accordance with a third exemplary embodiment for bidding on, scheduling and routing a print job.

FIG. 7 illustrates method steps performed in connection with the method illustrated in FIG. 4 in accordance with a third exemplary embodiment for bidding on, scheduling and routing a print job. FIG. 7 also illustrates the method steps S420 to S430 in more detail. Specifically, in a third exemplary embodiment, formulating the job query response in step S420 and receiving, scheduling and routing the job in step S430 of FIG. 4 begins in step S4380, in which job attributes are analyzed.

The job attributes include optimization criteria such as minimize cost, minimize time etc. The job attributes may be information provided as part of the job query received in step S410, information previously stored in a database of customer specific information, etc. Control then proceeds to step S4385 in which the remote processing equipment locations are polled and provide information about the present state of the remote document processing equipment, the equipment location, etc. Control then proceeds to step S4390.

In step S4390, job query results are formulated and output to the customer for review. These job query results include an optimized job schedule and routing scheme formulated based on the job attributes particular to the customer, the state data received from the remote document processing equipment locations and, optionally, information previously stored in the system about preferences and characteristics of the customer. Control then proceeds to step S4395, in which it is determined whether the customer has submitted the job for processing. If the job has not been submitted, control proceeds to step S43120. If a job has been submitted, control proceeds to step S43100.

In step S43100, the job and the customer's authorization for the optimized scheduling and routing scheme is received and control proceeds to step S43105. In step S43105, the job is scheduled and routed in accordance with the optimized schedule and scheme. Control then proceeds to step S440 as shown in FIG. 4. Subsequently, the system polls the remote processing equipment locations, provides information about the present state of the customer's job upon request by the customer, and reschedules and/or reroutes the job as requested by the customer until the job is completed as indicated by the method steps illustrated in FIG. 4.

If, in step S4395, no job is submitted, control proceeds to step S43110 in which it is determined whether the optimization criteria have been altered and submitted by the customer. If so, control returns to step S4380 for analysis of the job attributes and formulation of a new optimized job scheduling and routing scheme based on the changed optimization criteria. If not, control proceeds to step S43115, in which a plurality of optional job scheduling and routing schemes are formulated and outputted to the customer. Control then proceeds to step S43120. In step S43120, it is determined whether the customer has submitted the job for processing. If the job has not been submitted, control proceeds to step S43135, in which the method ends. If a job has been submitted, control proceeds to step S43125, in which the customer's job and job scheduling and routing scheme selection are received and control proceeds to step S43130. Instep S43130, the job is scheduled and routed based on the customer's selected routing and scheduling scheme and control proceeds. Control then proceeds to step S440 as shown in FIG. 4. Subsequently, the system polls the remote processing equipment locations, provides information about the present state of the customer's job upon request by the customer, and reschedules and/or reroutes the job as requested by the customer until the job is completed as indicated by the method steps illustrated in FIG. 4.

Because each of the exemplary embodiments enables feedback from the remote processing equipment about job data as a job is processed, the customer can use the data to satisfy himself whether the job has been processed according to his specifications. This allows the customer to provide appropriate feedback to the remote processing equipment based on that data, e.g., remote proofing, and validation of other job attributes such as billing and fulfillment.

Additionally, because exemplary embodiments of the invention provide real-time information about job loads, supplies, and equipment availability, the embodiments enable negotiation to obtain guaranteed performance and job delivery. Remote processing equipment servers at each location have complete real-time information about the loading of various equipment at the location, the state of media supplies at the location and jobs in queue at the location. The remote process equipment server in this location may use this information to provide real-time bids about job execution and delivery to customers. Customers can specify job requirements to various locations, obtain real-time bids and negotiate before submitting a job to a particular location for processing.

Moreover, because each remote processing equipment location server has complete knowledge of the state of each job that it is processing (or has processed), exemplary embodiments of the invention separately enable real-time job tracking. This information can be relayed to the customer, remote equipment location operators and/or the system server so that the job can be tracked as it progresses through processing and delivery.

Additionally, exemplary embodiments of the invention enable real-time rescheduling or rerouting of print jobs. Since the customer, a location operator or an expert system may each have complete knowledge of the real-time states of the jobs, each of these entities can replace/revise job processing data before the job is executed.

Exemplary embodiments of the invention enable remote customer review of completed jobs. The customer provides a complete description of the job that includes both processing and delivery. Some of the information the job may contain information, e.g., addresses of recipients of the executed job, that resides in the remote processing equipment location database. The location validates the content of the job, feeds it back to the customer and obtains his approval or revision before dispatching the completed job to the recipients.

While this invention has been described in conjunction with the specific embodiments outlines above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

For example, it should be appreciated that the system server 120 may be located at a remote processing equipment location. Additionally, the system server 120 and the remote processing equipment server 1310 may be realized in any number of computers.

Additionally, the architecture of the remote processing equipment location may be more complex or more simplistic then that illustrated in FIG. 3. Therefore, it is foreseeable that the actual operation and interaction of the various components may differ significantly from the exemplary structure described above in relation to FIG. 3.

It is also foreseeable that exemplary embodiments of the invention can enable the system to maintain job templates. For example, a particular location could provide pre-specified job templates particular to a customer. These templates may be generated based on similar job submission in the past. Additionally, it is foreseeable that the exemplary embodiments of the invention enable coordination of activity on a plurality of remote processing equipment at a particular location or locations. The availability of the states of all equipment at all locations and supplies in each of those locations allows the system to coordinate the activity of multiple equipment at one location, e.g., using the remote processing equipment server at that location, or multiple locations, e.g., using the system server.

Additionally, it is foreseeable that the exemplary embodiments of the invention can enable improved inventory control. The availability of an active information feedback control system that spans processing equipment, supplies, and operator and customer interfaces provide a location operator or server with a reliable estimate of inventory. This can greatly reduce costs related to maintaining inventory. The reduction in costs leads to higher profits for the location or system operator/owner and lower costs for the customer.

What is claimed is:

1. A job processing system, comprising:
    a plurality of pieces of remote processing equipment, one or more of which have knowledge of state information, the state information including status of a job as the job is processed;
    a system server that is coupled to the plurality of pieces of remote processing equipment and that coordinates operation of the pieces of remote processing equipment; and
    a customer interface that is coupled to the system server, the customer interface usable to input job data and informed job instructions for processing the job to the system;
    wherein:
        while the job is processed, the system server communicates with the plurality of pieces of remote processing equipment to receive the state information, repeatedly formulates job information relating to the job data and the state information and outputs the job information through the customer interface, receives the input informed job instructions through the customer interface and controls operation of the plurality of pieces of remote processing equipment based on the job data, informed job instructions and state information received from the plurality of remote processing equipment; and
        the informed job instructions are input in response to the repeatedly output job information as the job is processed.

2. The job processing system of claim 1, wherein the plurality of pieces of remote processing equipment outputs state information to the system server in real-time.

3. The job processing system of claim 1, wherein the system server outputs state information to the customer interface in real-time.

4. The job processing system of claim 1, wherein the system server alters processing of a print job based on informed job instructions received during job processing.

5. The job processing system of claim 1, wherein the state information includes the specification of at least one of the states of the processing equipment, supplies, personnel and the jobs.

6. The job processing system of claim 1, wherein:
    the plurality of pieces of remote processing equipment are located at a plurality of remote physical locations.

7. The job processing system of claim 6, further comprising:
    a plurality of remote process equipment servers, each remote process equipment server being located at one of the plurality of remote processing equipment locations and coordinating with the system server to control operation of any piece of remote processing equipment that is located at that location.

8. The job processing system of claim 7, wherein the system server receives state information in real-time in conjunction with the operation of the plurality of pieces of remote processing equipment.

9. The job processing system of claim 7, wherein the system server formulates and outputs job information in real-time in conjunction with receiving state information.

10. The job processing system of claim 1, wherein each of the plurality of pieces of remote processing equipment communicates elements of the state information of the system to the system server to be used to formulate job information output to the customer interface.

11. The job processing system of claim 1, wherein the state information indicates at least one of a projected job completion time, job completion costs, preview data indicating estimated job attributes, optional routing schemes or optional job schedules and an optimized routing scheme or optimized job schedule.

12. The job processing system of claim 11, wherein the job information includes the optimized routing scheme or optimized job schedule and is formulated based on job data and status information from the plurality of remote processing equipment.

13. The job processing system of claim 1, wherein the system server, the plurality of pieces of remote processing equipment and the customer interface are coupled together via a communications network.

14. The job processing system of claim 13, wherein the network is the Internet.

15. The job processing system of claim 1, wherein the jobs are print jobs.

16. A job processing method, comprising:
    receiving job data through a customer interface;
    receiving state information indicating the states of a plurality of pieces of remote processing equipment, the state information including status of a job as the job is processed;
    repeatedly formulating and outputting through the customer interface job information relating to the job data and the state information;
    receiving informed job instructions for processing the job through the customer interface, wherein the informed job instructions are input in response to the repeatedly output job information as the job is processed;
    coordinating operation of the pieces of remote processing equipment based on the job data, the state information and the informed job instructions.

17. The job processing method of claim 16, wherein the state information includes the specification of at least one of the states of the processing equipment, supplies, personnel and the jobs.

18. The job processing method of claim 16, wherein the state information is received from the plurality of pieces of remote processing equipment over a communication network.

19. The job processing method of claim 18, wherein the communication network is the Internet.

20. The job processing method of claim 16, wherein the job information includes at least one of an indication of a projected job completion time, an indication of job completion costs and an indication of job appearance.

21. The job processing method of claim 16, further comprising formulating at least one recommendation regarding job routing and scheduling.

22. The job processing method of claim 21, wherein the state information includes the at least one recommendation regarding job routing and scheduling.

23. The job processing method of claim 16, further comprising formulating a plurality of job routing or scheduling options that result in varying job completion costs.

24. The job processing method of claim 23, wherein the state information includes the plurality of job routing or scheduling options.

25. The job processing method of claim 16, wherein the jobs are print jobs.

26. The job processing method of claim 16, wherein the plurality of pieces of remote processing equipment outputs state information to the server in real-time.

27. The job processing method of claim 16, further comprising altering the processing of a print job based on informed job instructions received during job processing.

28. The job processing method of claim 16, further comprising altering the routing of a print job based on informed job instructions received during job processing.

29. The job processing method of claim 16, wherein the job instructions include specification of job optimization criteria.

* * * * *